May 11, 1937.　　　V. W. KLIESRATH　　　2,079,912
ENGINE
Filed April 6, 1934　　　3 Sheets-Sheet 1
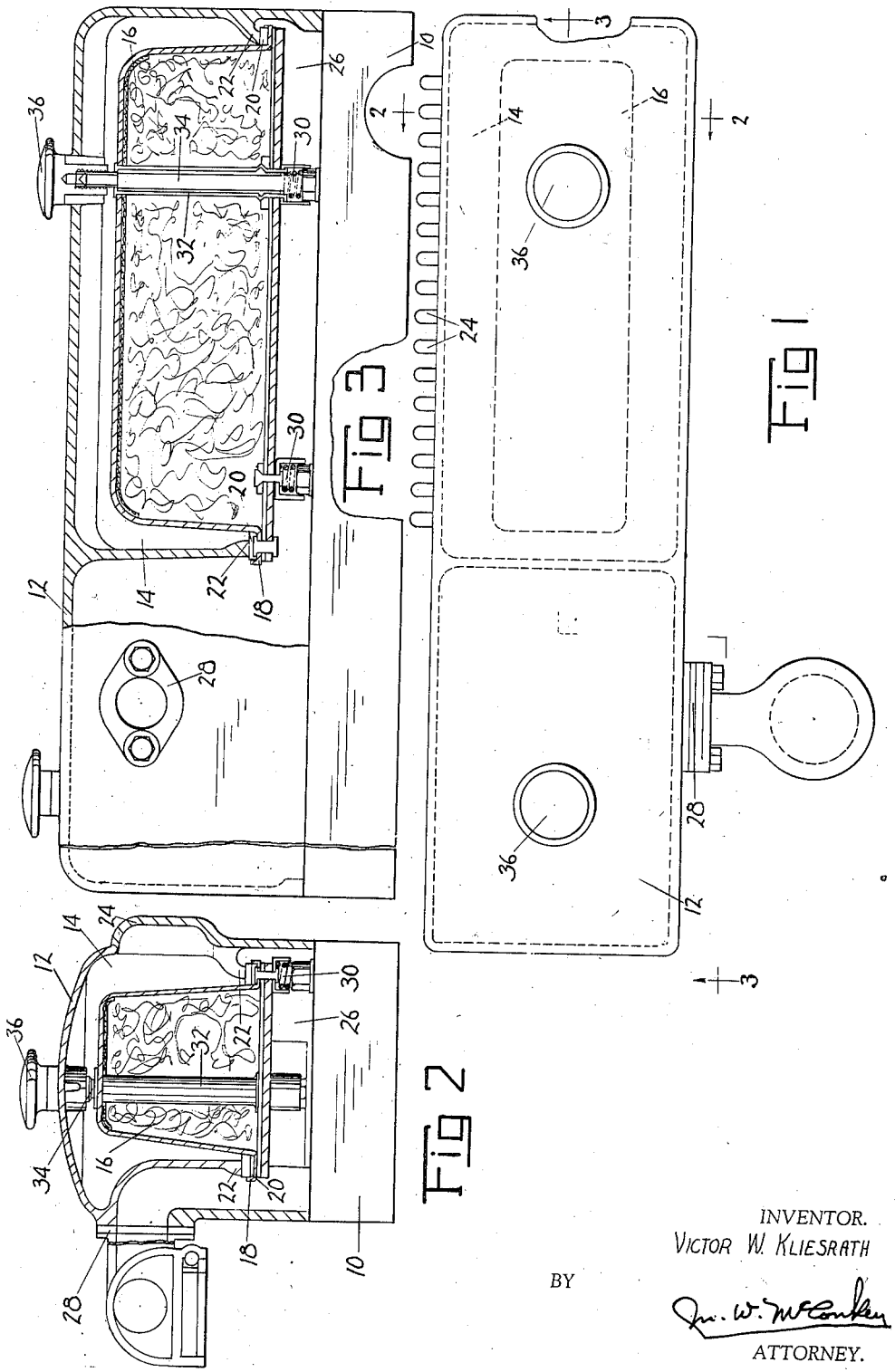
INVENTOR.
VICTOR W. KLIESRATH
BY
ATTORNEY.

May 11, 1937. V. W. KLIESRATH 2,079,912
ENGINE
Filed April 6, 1934 3 Sheets-Sheet 2

INVENTOR.
VICTOR W. KLIESRATH
BY
*Jn. W. McConkey*
ATTORNEY.

May 11, 1937.　　　V. W. KLIESRATH　　　2,079,912
ENGINE
Filed April 6, 1934　　　3 Sheets-Sheet 3

INVENTOR.
VICTOR W. KLIESRATH
BY
ATTORNEY.

Patented May 11, 1937

2,079,912

UNITED STATES PATENT OFFICE 2,079,912

ENGINE

Victor W. Kliesrath, South Bend, Ind., assignor to The Steel Wheel Corporation, Chicago, Ill., a corporation of New York Application April 6, 1934, Serial No. 719,315

9 Claims. (Cl. 123—122)

This invention relates to engines, especially automobile engines, and more particularly to providing the engines with simple and inexpensive but effective means for cleaning the air required for running the engine by means which at the same time serves to house in the top of the cylinder head and to circulate the cleaned air across the top of the cylinder head to cool it.

Preferably a novel air cleaning unit is supported above and upon the cylinder head, so that air may circulate downwardly through it, and the cylinder head has a hollow cover or housing mounted thereon and formed with a separate compartment or space receiving and sealing against the cleaner unit. This compartment is provided with air intake means such as louvered openings.

The air therefore passes from this intake downwardly through the cleaner unit, through the space below the cleaner unit and between the cleaner unit and the cylinder head, and thence into the space in the cover outside of the cleaner compartment. Means is provided for conveying the cleaned air from the interior of the cover to the carbureter and then, mixed with fuel to the intake manifold of the engine.

I prefer to form the cleaner unit as a separate casing with solid side walls and perforated or otherwise formed on its top and bottom for the passage of air, the casing containing the cleaning medium. This casing is formed, for example with a peripheral projecting flange, for sealing engagement with the side walls of the cleaner compartment in the cover, and in one embodiment it is shown with yielding devices holding its bottom spaced above the cylinder head, and engaging the cylinder head and urging the cleaner unit upwardly to hold this flange against the lower edge of the wall of the cleaner compartment.

Suitable means may be provided for attaching the cover to the cylinder head; in one arrangement one of the fastenings passes through a sleeve passing through and forming a part of the cleaner unit.

Another feature of the invention relates to adapting this construction to a V-type engine, by providing a cover containing a cleaner unit mounted on the cylinder head of each of the two angularly-related cylinder blocks, and conveying the cleaned air therefrom to one or a pair of carbureters arranged in the V between the cylinder blocks.

The above and other objects and features of the invention, including various novel combinations of parts and desirable particular constructions, will be apparent from the following description of the illustrative embodiments shown in the accompanying drawings, in which:

Figure 1 is a top plan view of an engine embodying my invention;

Figure 2 is a vertical transverse section through the cylinder head and the cover and the cleaner unit of the engine, on the line 2—2 of Figure 1;

Figure 3 is a vertical longitudinal section through the cylinder head and the cover and the cleaner unit, on the line 3—3 of Figure 1;

Figure 4:
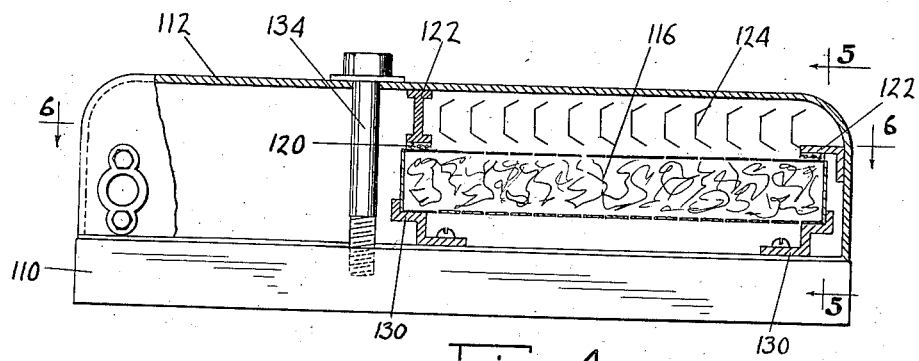
Figure 4 is a longitudinal section corresponding to Figure 3, but showing a second modification.

In the embodiment of Figures 1-3, the engine comprises a cylinder head 10, carrying the usual spark plugs and their wiring and the like accessories (not shown), provided with a novel cover 12 which seals at its lower edge against the top of the cylinder head.

This cover contains a space or compartment 14, which contains a novel air cleaner unit 16 shown with a peripheral projecting flange 18 having a gasket 20 or other means sealing against a ledge 22 formed around the bottom of the side walls of the space 14. One side of the compartment 14 is formed with louvers 24 provided with air intake openings facing toward the front of the engine (i. e. toward the fan).

The cleaner unit 16, which contains any suitable cleaning medium, has solid side walls, but the top and bottom are perforated or otherwise formed for the passage of air, so that the air from the intake has to pass downwardly through the cleaner unit into the space 26 between the cleaner unit and the cylinder head, and thence into the interior of the cover 12 outside of the cleaner compartment 14.

From the interior of the cover 12 the cleaned air, heated by contact with the cylinder head, is conveyed by a suitable manifold or conduit 28 to the carburetor (not shown) and thence, mixed with fuel, to the intake manifold of the engine.

The cleaner unit 16 in this embodiment has on its bottom yielding devices 30 spacing it above the cylinder head and containing springs urging the flange 18 toward the ledge 22. One of these devices is shown secured to the lower end of a sleeve 32 passing through and forming part of the cleaner unit and fitting over a fastening such as one of a pair of studs 34 carried by the cylinder head and threaded at their upper ends to receive cap nuts 36 securing the cover 12 in place.

Figure 5:
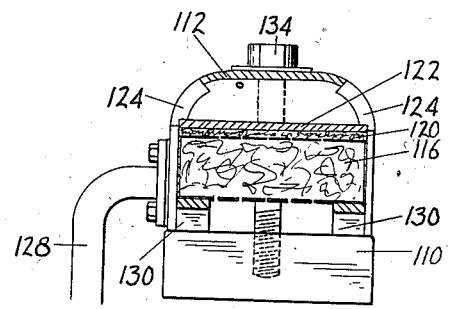
Figure 5 is a transverse section therethrough, on the line 5—5 of Figure 4.
Figure 6:
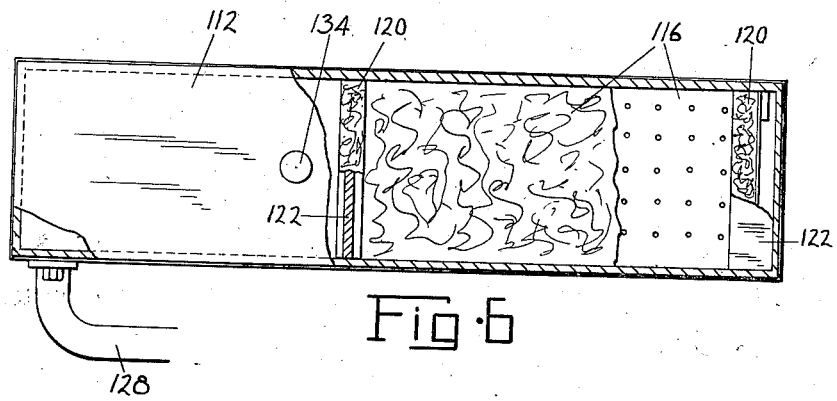
Figure 6 is a top plan view thereof, partly broken away on the line 6—6 of Figure 4.

The arrangement of Figures 4, 5, and 6 includes a cover 112 having separately-formed brackets 122 secured thereto and sealing against a gasket 120 peripherally seated on the upper surface of a cleaner unit 116 resting on suitable brackets or supports 130 secured to the cylinder head. The cleaner unit 116 is shown in Figure 6 at the right with its perforated top and at the left it is broken away to show the cleaning material it contains.

The air passes from louvered openings 124 down through the cleaner unit 116 and below that unit into the interior of the cover 112, and thence by a suitable conduit 128 to the carburetor. The cover is held by one or more fastenings 134.

Figure 7:
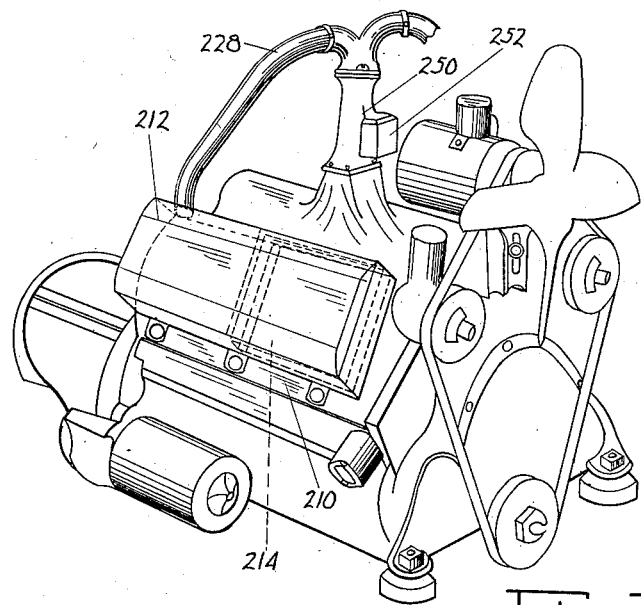
Figure 7 is a perspective view of a V-eight engine embodying my invention.
Figure 8:
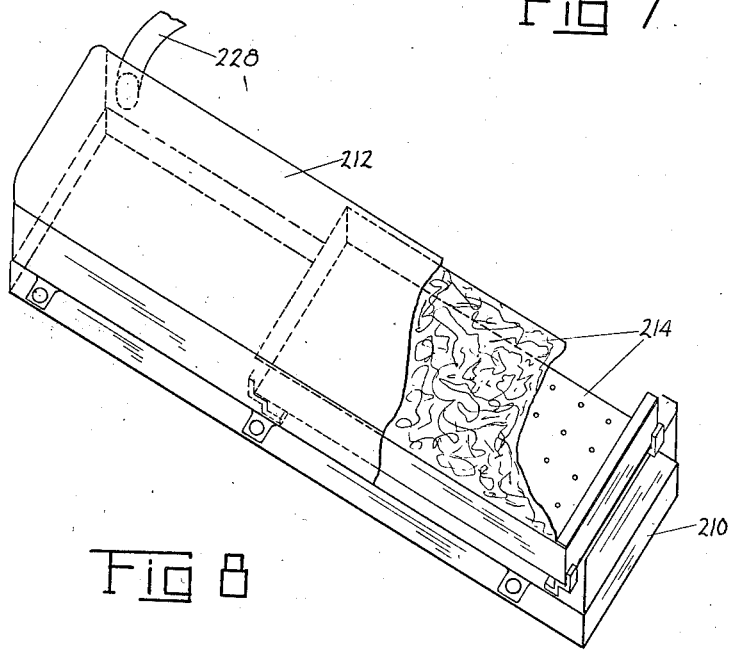
Figure 8 is a perspective, partly broken away, of one of the cylinder heads with its cover and cleaner unit.

In Figures 7 and 8 the invention is shown embodied in a V-type engine. The illustrated engine has two cylinder blocks arranged in a V on the same crankcase, in the usual manner, and each block has a cylinder head 210 carrying a cover 212 secured thereto over a cleaner unit 214 arranged as described above.

Cleaned air from both covers 212 is conveyed by means such as a pair of conduits 228 to an air intake 250 for a fuel-mixing device 252 (which may be an ordinary carbureter or a duplex carbureter or two carbureters, one for each cylinder block, as preferred). The carbureter 252 is arranged in the V between the two cylinder blocks, and communicates with the intake manifold in the usual manner.

While several illustrative embodiments have been described in detail, it is not my intention to limit the scope of the invention to those particular embodiments, or otherwise than by the terms of the appended claims.

I claim:

1. An engine having a cylinder head, a cleaner unit adapted to clean air passing therethrough from top to bottom and mounted on said cylinder head but spaced therefrom, a cover peripherally sealing against the cylinder head and having a cleaner compartment formed with air intake means and fitting over and peripherally sealing against said cleaner unit, whereby air entering through the air intake means is forced to pass through the cleaner unit and through the space between the cleaner unit and the cylinder head into the interior of said cover, and means for conveying cleaned air to the engine from the interior of said cover.

2. Engine housing means adapted to clean air for an engine comprising a cover adapted to seal peripherally against an engine cylinder head and formed with a compartment formed with an air intake and having peripheral sealing means spaced above the plane of the bottom of the cover, and a separate air cleaner unit adapted to be mounted on a cylinder head and having a peripheral sealing surface engaged by said sealing means and having means for spacing it above the cylinder head, whereby air is forced to circulate from said intake through the cleaner unit into the space below said unit and thence into the interior of said cover outside of said compartment.

3. Engine housing means adapted to clean air for an engine comprising a cover adapted to seal peripherally against an engine cylinder head and formed with a compartment formed with an air intake and having peripheral sealing means spaced above the plane of the bottom of the cover, and a separate air cleaner unit adapted to be mounted on a cylinder head and having a peripheral sealing surface engaged by said sealing means and having yielding devices spacing it above the cylinder head, and urging said surface upwardly against the sealing means, whereby air is forced to circulate from said intake through the cleaner unit into the space below said unit and thence into the interior of said cover outside of said compartment.

4. Engine housing means adapted to clean air for an engine comprising a cover adapted to seal peripherally against an engine cylinder head and formed with a compartment formed with an air intake and having peripheral sealing means spaced above the plane of the bottom of the cover, and a separate air cleaner unit adapted to be mounted on a cylinder head and having a peripheral sealing surface engaged by said sealing means and having means for spacing it above the cylinder head, whereby air is forced to circulate from said intake through the cleaner unit into the space below said unit and thence into the interior of said cover outside of said compartment, in combination with attaching devices for secuirng the cover to a cylinder head, said cleaner unit being provided with a sleeve through which one of said devices passes.

5. Engine housing means adapted to clean air for an engine comprising a cover adapted to seal peripherally against an engine cylinder head and formed with a compartment formed with an air intake and having peripheral sealing means spaced above the plane of the bottom of the cover, and a separate air cleaner unit adapted to be mounted on a cylinder head and having a peripheral sealing surface engaged by said sealing means and having yielding devices spacing it above the cylinder head and urging said surface upwardly against the sealing means, whereby air is forced to circulate from said intake through the cleaner unit into the space below said unit and thence into the interior of said cover outside of said compartment, in combination with attaching devices for securing the cover to a cylinder head, said cleaner unit being provided with a sleeve through which one of said devices passes.

6. An air cleaner unit comprising a casing having air-tight side walls and formed at top and bottom for the passage of air and containing a cleaning medium and having a peripheral external outwardly projecting flange adapted to seat against a cover, said unit having on its bottom a plurality of yielding devices adapted to engage a cylinder head and urge said flange upwardly against a seat.

7. An air cleaner unit comprising a casing having air-tight side walls and formed at top and bottom for the passage of air and containing a cleaning medium and having a peripheral external outwardly projecting flange adapted to seat against a cover, said unit having a sleeve passing therethrough from top to bottom to permit the passage of a cover-attaching device.

8. An air cleaner unit comprising a casing having air-tight side walls and formed at top and bottom for the passage of air and containing a cleaning medium and having a peripheral external outwardly projecting flange adapted to seat against a cover, said unit having on its bottom a plurality of yielding devices adapted to engage a cylinder head and urge said flange upwardly against a seat, and said unit having a sleeve passing therethrough from top to bottom to permit the passage of a cover-attaching device.

9. An air cleaner unit comprising a casing having air-tight side walls and formed at top and bottom for the passage of air and containing a cleaning medium and having a peripheral external outwardly projecting flange adapted to seat against a cover, said unit having on its bottom a plurality of yielding devices adapted to engage a cylinder head and urge said flange upwardly against a seat, and said unit having a sleeve passing therethrough from top to bottom to permit the passage of a cover-attaching device, the bottom of said sleeve having one of the yielding devices attached thereto.

VICTOR W. KLIESRATH.